United States Patent Office 3,254,301
Patented May 31, 1966

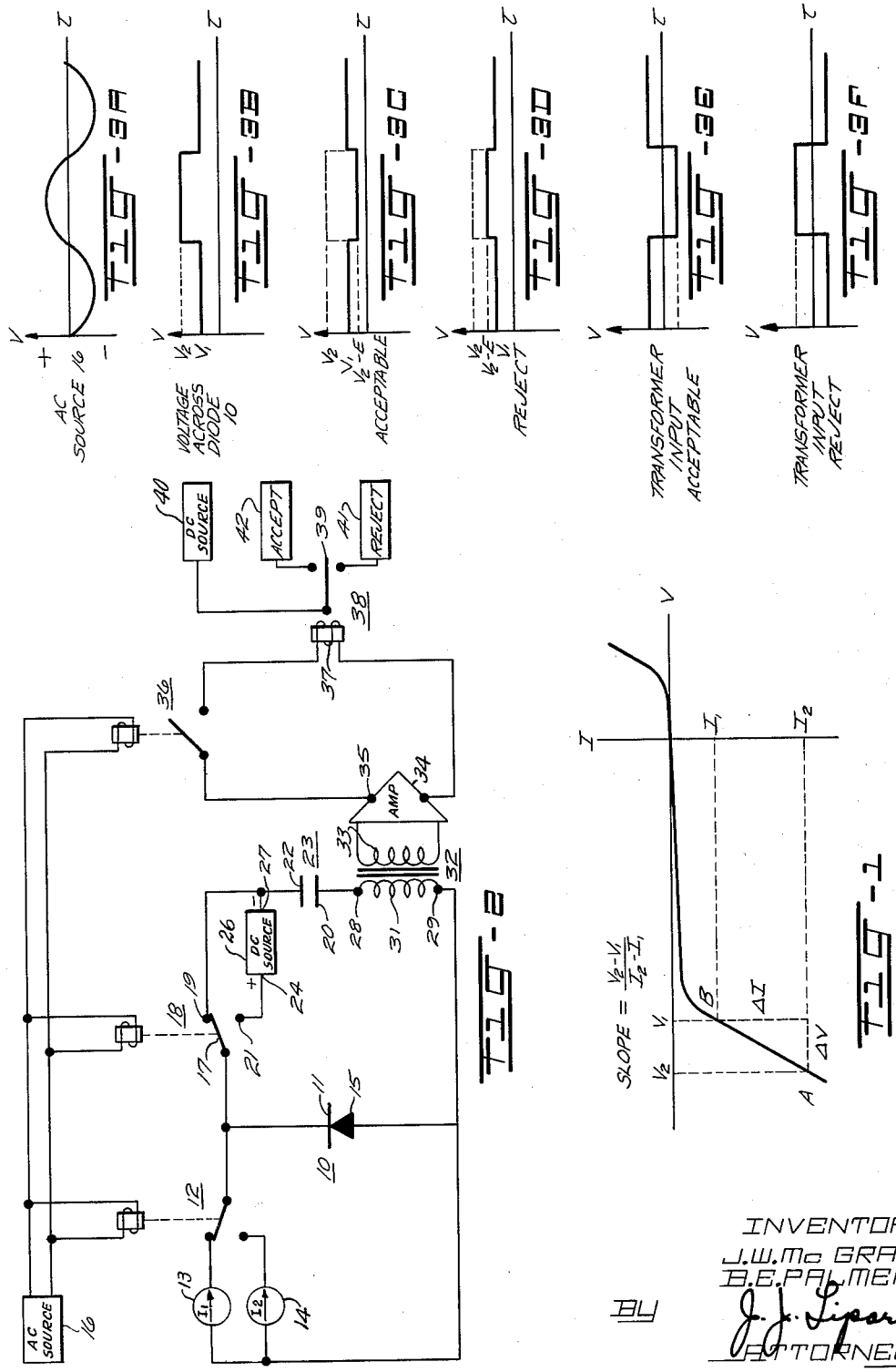

3,254,301
APPARATUS FOR TESTING SLOPES OF CHARACTERISTIC CURVES BY THE SEQUENTIAL ENERGIZATION OF THE COMPONENT UNDER TEST
John W. McGrath and Burtis E. Palmer, Allentown, Pa., assignors to Western Electric Company, Incorporated, New York, N. Y., a corporation of New York
Filed June 27, 1962, Ser. No. 205,788
5 Claims. (Cl. 324—158)

This invention relates to circuits for testing electrical components and, more particularly, to circuits for testing electrical components to determine whether the slope of a predetermined section of a characteristic curve of a component is above or below a predetermined reference value. Accordingly, the general objects of this invention are to provide new and improved circuits of such character.

The operating characteristics of an electrical component such as a diode, transistor, electron tube, etc., are of prime importance in determining the usefulness of the device. For example, semiconductor breakdown or "zener" diodes are employed where it is desired to provide a circuit, or portion of a circuit, which is operable at one and only one voltage. One of the characteristics of the diode which determines how useful it will be in this regard is its reverse slope. It is this characteristic which determines how well the diode "clamps" or regulates at the zener voltage. Accordingly, before such a device can be employed as a practical component part of a circuit, its operating characteristics must be examined. Further, where mass production techniques are employed in the manufacture of the device, the apparatus used in the testing thereof must have features which are commensurate with the aims and requirements of such techniques.

It is, therefore, another object of this invention to provide new and improved circuits for simply, accurately and automatically testing electrical components having non-linear voltage-current characteristics to determine whether the slope of a predetermined section of the voltage-current characteristic curve of such a component is above or below a predetermined reference value.

Broadly, the foregoing and other objects of the invention are achieved by sequentially applying two input signals to a component under test in sequence, one signal being of greater magnitude than the other, and each corresponding to an end point of a predetermined section of a characteristic curve of the component. Each applied signal results in a translated output signal from the component. The difference between the translated output signals is a function of the slope of the curve at the predetermined section. A reference signal is combined algebraically with a first one of the output signals to produce a combined signal in which the value of the first output signal is shifted toward the second by the value of the reference signal. The reference signal has a value equal to the difference between the values of the output signals which would result were the slope of the curve at the predetermined section equal to the predetermined reference value. Accordingly, the value of the combined signal is greater than the value of the second output signal when the slope differs in one direction from the reference value, and is less when the slope differs in the opposite direction. The levels of the combined signal and the second output signal are shifted to produce a zero-average, composite signal of one phase if the combined signal is greater than the second output signal, and of the opposite phase if less than the second output signal. The composite signal is detected to ascertain type of the predetermined curve section is the predetermined reference value.

The invention will be more readily understood from the detailed description which follows when read in conjunction with the drawings, wherein:
FIG. 1 is a graph of the reverse conduction characteristics of a typical "zener" diode;
FIG. 2 is a schematic circuit diagram of an illustrative embodiment of the invention; and,
FIGS. 3A to 3F are a series of voltage wave forms which illustrate the operation of the circuit of FIG. 2.

As an illustration, the invention will be described as being employed to determine the realtionship of the reverse slope of a semiconductor "zener" diode to a predetermined value thereof. If the slope is greater than this value, the diode is considered a reject; if it is less than this value, the diode is considered acceptable.

Referring now to FIG. 1, which is a plot of the reverse conduction characteristics of a semiconductor "zener" diode, the reverse slope of the diode is the ratio of the change in voltage, $V_2-V_1$, between two points A and B on the curve to the change in current $I_2-I_1$, between those points. Thus, the change in voltage for a given change in current is a measure of the diode slope and a comparison of this quantity with a predetermined increment can be used to indicate the acceptability or non-acceptability of the diode slope.

This principle is utilized in the circuit of FIG. 2 which includes three polarized relays 12, 18 and 36, each energized by the same source of sinusoidal A.C. power 16 and thus all operating in synchronism.

The cathode 11 of a diode 10, whose slope is to be determined, is connected through the contacts of relay 12 to the positive terminals of two constant current sources 13 and 14 which deliver currents $I_1$ and $I_2$ respectively and alternately to diode 10. The magnitude of current $I_2$ is greater than the magnitude of current $I_1$, and the magnitude of each is sufficient to place diode 10 into its breakdown region. The relay 12 operates to switch the source 13 into the circuit for the negative half of each A.C. cycle and the source 14 into the circuit for the positive half of each cycle. When the source 13 is in the circuit, current $I_1$ will flow through the diode 10 in the reverse direction (i.e., from the cathode 11 to the anode 15, and develop a voltage $V_1$ therebetween, and when the source 14 is in the circuit, current $I_2$ will flow through the diode 10 in the reverse direction and develop a voltage $V_2$ across it.

The cathode 11 of the diode 10 is also connected to the armature 17 of the relay 18. A contact 19 of the relay 18 is connected directly to a plate 22 of a D.C. blocking capacitor 23, and a contact 21 thereof is connected to the positive terminal 24 of a D.C. voltage source 26. The negative terminal 27 of the source 26 is connected to the capacitor plate 22. The magnitude E of the voltage source 26 is equal to the allowable increase of $V_2$ over $V_1$, that is, it is determinative of the desired slope of the diode 10. The plate 20 of capacitor 23 and the anode 15 of the diode 10 are connected respectively to terminals 28 and 29 of one primary winding 31 of a transformer 32. The relay 18 operates to substract the voltage E of the source 26 from $V_2$ each time $V_2$ is developed across the diode 10.

The secondary winding 33 of the transformer 32 is connected to the input of a conventional A.C. amplifier 34, the output of the amplifier 34 being connected to a phase detection circuit which includes the contacts of the relay 36 and the coil 37 of a polarized relay 38.

The operation of the circuit of FIG. 2 may best be described in connection with the voltage-time wave forms of FIGS. 3A through 3F. It is assumed for the purposes of this description that the operation of the circuit of FIG. 2 commences at a time which corresponds to the beginning of a negative half cycle of the output signal of the A.C. source 16 (FIG. 3A). During this negative half cycle, the respective armatures of the relays 12, 18 and 36 are in their upper contact positions as shown. Accordingly, a current $I_1$ is delivered to the diode 10 from the source 13, and the resultant voltage $V_1$ developed across it is fed directly to the capacitor 23.

During the positive half cycle of the output signal of the A.C. source 16, the respective armatures of the relays 12, 18 and 36 are in their lower contact positions and accordingly, a voltage $V_2$ is developed across the diode 10. The resultant signal developed across the diode for a complete cycle is depicted in FIG. 3B. The voltage E of the source 26 is then subtracted from $V_2$ and the resultant voltage fed to the capacitor 23. When E is subtracted from $V_2$, generally two conditions can result: $V_2-E$ can be either less or greater than $V_1$. If it is less than $V_1$ (FIG. 3C), the diode 10 is considered acceptable; if it is greater than $V_1$ (FIG. 3D), the diode 10 is considered a reject. The capacitor 23 removes the D.C. level of the signal applied thereto, the wave forms which might result therefrom being illustrated in FIGS. 3E and 3F. As is seen, both signals, i.e., accept and reject, resemble each other except for their phase. The resultant signal is then amplified and its phase detected.

The phase detection of the amplified signal is accomplished by decoupling the relay 38 from the amplifier 34 during the negative half cycle of the A.C. source 16, and coupling the relay 38 to the amplifier 34 during the positive half cycle of the A.C. source 16. Accordingly, if $V_2-E$ is greater than $V_1$, a positive signal will result at the output terminal 35 of the amplifier 34 during the positive half cycle of the source 16. This results in the armature 39 of the relay 38 being thrown to the REJECT position and, in turn, causes a reject circuit 41, shown in block diagram form, to be actuated by a suitable voltage supplied from a source 40. If $V_2-E$ is less than $V_1$, a negative signal will appear at the output terminal 35 of the amplifier 34 and the armature 39 of the relay 38 will be thrown to the ACCEPT position. This causes an accept circuit 42, shown in block diagram form, to be actuated by the voltage supplied from a source 40. The reject and accept circuits may be of a conventional form providing an electrical, mechanical or other type of indication.

It should be noted that there is third condition which can arise when E is substracted from $V_2$, that is, $V_2-E$ can be equal to $V_1$. However, the occurrence of this third condition is extremely rare and accordingly, no provisions have been made in the circuit to detect this condition.

It is to be understood that the above-described arrangement is simply illustrative of the application of the principles of the invention. Thus, although the relays 12, 18 and 36 have been shown and described as three individual relays, it should be obvious to one skilled in the art that a single relay having three sets of contacts may be employed instead. Further, it may be desirable in some instances to add a voltage to $V_1$ rather than to subtract a voltage from $V_2$. In this case, the negative terminal 27 of the D.C. voltage source 26 would be connected to the contact 19 of the relay 18 and the positive terminal 24 of the source 26 and the contact 21 of the relay 18 would be connected directly to the capacitor plate 22.

Also, although the invention has been described and illustrated as being employed to examine the reverse slope of a semiconductor "zener" diode, it should be apparent that its use is not so limited and that the invention is easily adaptable to the examination of other operating characteristics of diodes, as well as the operating characteristics of other electrical components. For example, the invention may be used to examine the shape of the reverse knee and the forward slope, of the dynamic characteristic curve of the diode.

Numerous other arrangements may be readily devised by those skilled in the art which will embody the principles of the invention and fall within the spirit and scope thereof.

What is claimed is:
1. A circuit for testing an electrical component to determine whether the slope of a predetermined section of a characteristic curve of the component is above or below a predetermined reference value, which comprises:
  means for applying two input signals to the component in sequence, the input signals having predetermined magnitudes corresponding to one of the coordinates of each of two selected points on the characteristic curve, the selected points defining the predetermined section of the curve to be tested, each input signal in sequence resulting in a translated output signal from the component having a value corresponding to the other of the coordinates of the two selected points on the curve, the difference between the values of the two output signals being a function of the slope of the curve at the predetermined section;
  means for combining algebraically a first one of the output signals with a predetermined reference signal to produce a combined signal in which the value of the first output signal is shifted toward the second by the value of the reference signal, the reference signal having a value equal to the difference between the values of the output signals which would result were the slope of the curve equal to the predetermined reference value, so that the value of the combined signal is greater than the value of the second output signal when the slope differs in one direction from the reference value and is less when the slope differs in the opposite direction;
  means for shifting the levels of the second output signal and the combined signal to produce a zero-average, composite signal of one phase if the combined signal is greater than the second output signal and of the opposite phase if the combined signal is less than the second output signal; and
  means for detecting the phase of the composite signal to ascertain whether the slope of the curve at the predetermined section is above or below the reference value.
2. A circuit for testing an electrical component having a nonlinear voltage-current characteristic curve to determine whether the slope of a predetermined section of the curve is above or below a predetermined reference value, the section under test being displaced from zero, which circuit comprises:
  a first source of electrical energy capable of applying to the component a first input signal having a magnitude corresponding to a first end point of the predetermined section of the curve;
  a second source of electrical energy capable of applying to the component a second input signal having a magnitude corresponding to the second end point of the predetermined section;
  switching means for connecting the first and second energy sources to the component in sequence to sequentially apply the first and second input signals thereto, whereupon first and second output signals are induced sequentially across the component, the output signals having magnitudes dependent on the slope of the predetermined section of the curve;
  a third source of electrical energy capable of supplying a reference signal having a magnitude equal to the difference between the output signals which would obtain were the slope of the predetermined curve section equal to the predetermined reference value;
  means for connecting the third energy source to the component to algebraically combine the reference signal with a first one of the output signals in a se which changes the value of that output signal toward the value of the second output signal by an amount equal to the value of the reference signal so that the value of the combined signal is greater than that of the second output signal when the slope differs in one direction from the reference value and is less when the slope differs in the opposite direction;

means, including a capacitor, for shifting the levels of the second output signal and the combined signal such as to develop a zero-average, composite signal of one phase if the combined signal is greater than the second output signal and of the opposite phase if the combined signal is less than the second output signal; and means for detecting the phase of the composite signal to ascertain whether the slope of the curve at the predetermined section is above or below the reference value.

3. A circuit in accordance with claim 2, wherein the first and second electrical sources are constant current sources and the third electrical energy source is a constant voltage source.

4. A circuit in accordance with claim 2, wherein means are provided for operating the first and second switching means synchronously and cyclically so that the composite signal has an excursion of one polarity during the first half of each cycle and an excursion of the opposite polarity during the other half of the cycle, the polarities of the excursions depending upon whether the combined signal is greater than or less than the second output signal.

5. A circuit in accordance with claim 4, wherein:
the phase shifting means includes a relay of the type which operates in one direction if the signal applied thereto is of one polarity and operates in the opposite direction if the signal applied thereto is of the opposite polarity; and third switching means operable in synchronism with the first and second switching means for connecting the relay to the output of the level shifting means during one-half of each cycle, the direction of operation of the relay indicating whether the slope of the component is above or below the predetermined reference value;

means are provided, responsive to operation of the relay in one direction, for indicating that the slope of the component is above the predetermined reference value; and means are provided, responsive to operation of the relay in the opposite direction, for indicating that the slope of the component is below the predetermined reference value.

References Cited by the Examiner

UNITED STATES PATENTS

| | | | |
|---|---|---|---|
| 3,010,068 | 11/1961 | Ferguson | 324—98 |
| 3,039,057 | 6/1962 | Connors | 324—158 |
| 3,048,779 | 8/1962 | Davis | 324—158 |
| 3,104,343 | 9/1963 | McGrogan | 324—158 X |
| 3,134,073 | 5/1964 | Dickerson | 324—158 |

WALTER L. CARLSON, *Primary Examiner.*

E. L. STOLARUN, *Assistant Examiner.*